(12) United States Patent
Oyama

(10) Patent No.: US 7,703,491 B2
(45) Date of Patent: Apr. 27, 2010

(54) PNEUMATIC TIRE WITH TREAD HAVING GROOVES INCLUDING PROTRUSIONS CONNECTED BY JOINT

(75) Inventor: Toshiro Oyama, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 934 days.

(21) Appl. No.: 10/578,875

(22) PCT Filed: Sep. 9, 2005

(86) PCT No.: PCT/JP2005/016596

§ 371 (c)(1),
(2), (4) Date: May 11, 2006

(87) PCT Pub. No.: WO2006/043373

PCT Pub. Date: Apr. 27, 2006

(65) Prior Publication Data

US 2008/0149242 A1    Jun. 26, 2008

(30) Foreign Application Priority Data

Oct. 18, 2004   (JP) ............................ 2004-303235

(51) Int. Cl.
*B60C 11/11* (2006.01)
*B60C 11/13* (2006.01)

(52) U.S. Cl. .............................. 152/209.19; 152/DIG. 1

(58) Field of Classification Search ............ 152/209.18, 152/209.19, 209.21, 209.22, DIG. 1
See application file for complete search history.

(56) References Cited

U.S. PATENT DOCUMENTS 5,160,385 A * 11/1992 Goto et al. ............. 152/209.19
5,417,269 A * 5/1995 Kinoshita et al. ......... 152/209.19

(Continued)

FOREIGN PATENT DOCUMENTS

JP        62-194908        8/1987

(Continued)

OTHER PUBLICATIONS

PCT International Search Report for PCT/JP2005/016596 mailed on Nov. 29, 2005.

(Continued)

*Primary Examiner*—Steven D Maki
(74) *Attorney, Agent, or Firm*—Greer, Burnts & Crain, Ltd.

(57) ABSTRACT

To provide a pneumatic tire capable of improving resistance to stone drilling while ensuring snow traction performance, protrusions are arranged at intervals in a groove, each of the protrusions being lower than a height of a block and being separated from the block. The protrusion includes a protrusion main portion having a top portion, and a sloped portion having a slope of which angle with a groove bottom is formed in a range from 3 to 60°. The sloped portion is formed at positions in two directions which are mutually opposite to each other at least along the groove. Consequently, a stone trapped within the groove moves up to the top portion along the slope, and is ejected from the groove. Since the protrusions are arranged separately from the block and are arranged at intervals, the capacity of the groove is ensured. Thus, the resistance to stone drilling can be improved while the snow traction performance is ensured.

12 Claims, 16 Drawing Sheets

U.S. PATENT DOCUMENTS

| | | | | |
|---|---|---|---|---|
| 5,975,172 | A * | 11/1999 | Nakatsuji | 152/209.19 |
| 6,601,624 | B2 * | 8/2003 | Ratliff, Jr. | 152/209.19 |
| 2005/0103416 | A1 * | 5/2005 | Rooney et al. | 152/209.19 |
| 2005/0230020 | A1 * | 10/2005 | Miyake | 152/209.19 |
| 2007/0062626 | A1 * | 3/2007 | Oyama | 152/209.19 |

FOREIGN PATENT DOCUMENTS

| | | | |
|---|---|---|---|
| JP | 3-67706 | | 3/1991 |
| JP | 4-274906 | | 9/1992 |
| JP | 06-239107 | * | 8/1994 |
| JP | 6-239108 | | 8/1994 |
| JP | 06-239108 | * | 8/1994 |
| JP | 10-35225 | | 2/1998 |
| JP | 2002-29221 | | 1/2002 |

OTHER PUBLICATIONS

English translation of International Search Report dated Nov. 29, 2005.

* cited by examiner

FIG.17

| | CONVENTIONAL EXAMPLE 1 CUBOID PROTRUSION | CONVENTIONAL EXAMPLE 2 RIB-SHAPED PROTRUSION | CONVENTIONAL EXAMPLE 3 WAVEFRONT-SHAPED PROTRUSION | COMPARATIVE EXAMPLE 1 | COMPARATIVE EXAMPLE 2 |
|---|---|---|---|---|---|
| NUMBER OF SLOPES | - | - | 2 | 1 | 3 |
| ANGLE OF SLOPE | - | - | 45 | 5 | 70 |
| RESISTANCE TO STONE DRILLING | 100 | 120 | 110 | 100 | 100 |
| SNOW TRACTION PERFORMANCE | 100 | 80 | 70 | 100 | 100 |

FIG.18

|  | PRESENT INVENTION 1 | PRESENT INVENTION 2 | PRESENT INVENTION 3 | PRESENT INVENTION 4 | PRESENT INVENTION 5 | PRESENT INVENTION 6 |
|---|---|---|---|---|---|---|
| NUMBER OF SLOPES | 2 | 3 | 3 | 3 | 4 | 5 |
| ANGLE OF SLOPE | 3 | 5 | 30 | 40 | 60 | 60 |
| RESISTANCE TO STONE DRILLING | 115 | 125 | 120 | 110 | 105 | 105 |
| SNOW TRACTION PERFORMANCE | 100 | 100 | 100 | 100 | 100 | 95 | ns

PNEUMATIC TIRE WITH TREAD HAVING GROOVES INCLUDING PROTRUSIONS CONNECTED BY JOINT

TECHNICAL FIELD

The present invention relates to a pneumatic tire, and more particularly, to a pneumatic tire capable of suppressing occurrence of stone drilling while keeping traction performance on a snowy road and the like.

BACKGROUND ART

In conventional pneumatic tires, stones are sometimes held or trapped within grooves that are formed on the tread area of a pneumatic tire fitted to a vehicle, during its travel. Furthermore, such stones may penetrate the bottoms of the grooves due to rolling of the pneumatic tire, and so-called "stone drilling" may occur. If the stone drilling occurs in the above manner, then the stones having penetrated causes cracking of the groove bottoms and damage to a belt layer when the stone penetration occurs so deeply. If the belt layer is damaged, water comes into the belt layer from the outside through a hole made by the stone drilling, and steel forming the belt layer is rusted, which may lead to tread separation.

Some of the conventional pneumatic tires have protrusions in the grooves in order to minimize stone trapping in the grooves. For example, in Patent Literature 1, a pneumatic tire has circumferential grooves, along which protrusions are provided. These protrusions can minimize stone trapping in the circumferential grooves. Furthermore, in the Patent Literature 1, a protrusion is located at an intersection between a circumferential groove and a lateral groove, and is formed so as to fit also along the lateral groove. Stones or the like are easily held in the portion where the grooves intersect each other, and stone trapping thereby easily occurs therein. However, by forming the protrusion disposed at this portion into such a form that the protrusion fits also along the lateral groove, the stone trapping hardly occurs. Since the pneumatic tire runs on the snowy road, snow traction performance is also required. High snow traction performance can be obtained by increasing the capacity of the grooves to cause the snow on the road to enter the grooves, and by pushing aside the snow. Therefore, the protrusions, which are almost cuboids, are arranged at intervals to ensure the capacity of the grooves.

[Patent Literature 1] Japanese Patent Application Laid-Open No. H03-67706.

DISCLOSURE OF INVENTION

Problems to be Solved by the Invention

When the protrusions are formed in the above manner, however, a stone having entered the groove catches on the edge of the protrusion, formed into the cuboid, in the direction along the circumferential groove, and the protrusion may sometimes be damaged thereby. The stone having entered the groove is to move along the groove due to rolling of the pneumatic tire. Therefore, if the stone catches on the protrusion, load is applied to the protrusion by the force with which the stone is going to move, so that the protrusion may be cracked or chipped. Particularly, the protrusion is prone to be cracked or chipped as wear of the tread area progresses. When the protrusion, allowing for the snow traction performance, is chipped, the effects of minimizing the stone trapping and the stone drilling are reduced.

The present invention has been achieved to solve at least the conventional problems, and it is an object of the present invention to provide a pneumatic tire capable of improving resistance to stone drilling while ensuring snow traction performance.

Means to Solve the Problems

According to the study carried out by the inventors of the present invention for solving the problems, to make clear the mechanism of damage to the protrusions provided in the groove bottoms, the pneumatic tire with cuboid protrusions, which were arranged at intervals in the groove bottoms, was fitted to the drive shaft of a 2-D vehicle, and the 2-D vehicle was caused to run a fixed distance along a course paved with stones. There were stones retained after the vehicle ran, without being ejected from the grooves. The stones retained were numbered, and positions where the stones had been trapped were recorded, and then the stones trapped were observed in the method of causing the vehicle to run again on the course. As the result of observation carried out in this manner, it was found that about 90% of the stones initially trapped were ejected. Then, the stones retained after the ejection were observed, and it was found that the stones moved from the positions, where the stones had been trapped, in the direction opposite to the direction of rotation of the pneumatic tire, and that the stones caught on the protrusions formed in the positions to which the stones moved and parts of the protrusions were thereby damaged. The pneumatic tire was then caused to further run, based on the same conditions as these in the previous running, so as to be worn out up to 50% thereof. As the result of this, stone trapping was found in about 60% of the protrusions which were chipped due to the damage. Furthermore, as the result of causing it to run so as to be worn out up to 80% thereof, it was found that the stones in the parts chipped of the protrusions were not ejected but gave damage to tread rubber of the groove bottoms. As the result of careful study by the inventors in the above manner, the damage to the tread rubber, namely, how the stone drilling occurred was found out, to reach achievement of the present invention.

To solve the above problems and to achieve the goal, a pneumatic tire according to one aspect of the present invention includes a tread area that is divided into a plurality of lands by a plurality of grooves formed in the tread area. Each of the grooves includes a plurality of protrusions arranged at intervals on a bottom of the groove. The protrusions are lower than the lands from the bottom of the groove, and separated from the lands. Each of the protrusions includes a protrusion main body having a top portion that is a highest portion from the bottom of the groove; and a slope portion having a slop that makes an angle with the bottom of the groove in a range between 3 degrees and 60 degrees. The slope portion is formed in at least one direction along the groove.

According to the present invention, the protrusions are provided in the groove. Since the protrusions are formed at intervals, and are separated from the lands, the capacity of the groove can be ensured. Therefore, when the pneumatic tire runs on the snowy road, the snow on the road surface enters the grooves, and the pneumatic tire enables to push a lot of snow aside, to ensure snow traction performance. Furthermore, the protrusion includes the sloped portion having the slope of which angle with the groove bottom is in a range from 3 to 60°. Therefore, even if a stone is trapped within the groove, the stone moves also in the tire radial direction along the slope by rolling of the pneumatic tire, without catching on the protrusion when moving along within the groove. Consequently, the stone trapped within the groove is ejected from the groove. Thereby minimizing the occurrence of stone drilling while the snow traction performance is ensured.

According to the present invention, the slope portion is formed in at least two opposite directions with respect to the protrusion main body along the groove.

According to the present invention, the sloped portion is formed in the two directions which are mutually opposite to each other with respect to the protrusion main portion along the groove. Therefore, the stone trapped within the groove moves along the groove, and thereby more surely contacts the sloped portion. Consequently, the stone can be more definitely moved in the tire radial direction and ejected from the groove. This more reliably allows improvement of the resistance to stone drilling.

According to the present invention, a width of the slope is 0.7 time to 1.1 times of a width of the top portion in a direction of the width of the slope.

According to the present invention, by forming the width of the slope in the range, the resistance to stone drilling can be improved while the snow traction performance is more definitely ensured. More specifically, if the width of the slope is narrower than 0.7 times of the width of the top portion, the stone trapped within the groove may be held between the land and the sloped portion. In this case, even if the stone contacts the slope, the stone is not ejected from the groove, and hence, the resistance to stone drilling may be difficult to be improved. On the other hand, if the width of the slope is wider than 1.1 times of the width of the top portion, the capacity of the groove may be decreased. Therefore, when the pneumatic tire runs on the snowy road, the amount of the snow entering the grooves decreases, and the amount of the snow on the snowy road to be pushed aside may decrease. This causes the snow traction performance to be hardly ensured. By forming the width of the slope so as to become 0.7 to 1.1 times of the width of the top portion, the stone trapped within the groove can be more definitely ejected to the outside while the capacity of the groove is ensured. This allows improvement of the resistance to stone drilling while the snow traction performance is more reliably ensured.

According to the present invention, a height of the top portion from the bottom of the groove is equal to or more than 2 millimeters and equal to or less than a half of a height of the lands.

According to the present invention, since the top portion is formed at the height of 2 mm or more, the stone trapped within the groove can be more surely ejected from the groove. In other words, if the height of the top portion is less than 2 mm, it is not so different from the level of the groove bottom in the depth direction of the groove. Since the distance from the top portion to the opening is large, ejection of the stone to the outside of the groove may become difficult. The height from the groove bottom to the top portion is therefore provided by 2 mm or more, and the top portion is made to closer to the opening of the groove, thereby more reliably ejecting the stone trapped within the groove to the outside. Furthermore, since the top portion is formed at the height of ½ or less of the height of the land, the volume of the protrusions with respect to the groove does not become too large. Therefore, even if the protrusions are provided in the groove, the capacity of the groove can be prevented from becoming too small. Consequently, even when the vehicle runs on the snowy road, a lot of snow can be pushed aside. These allow improvement of the resistance to stone drilling while the snow traction performance is more reliably ensured.

According to the present invention, a joint is provided between two adjacent protrusions, a height of the joint is equal to or less than 1 millimeter from the bottom of the groove, and the two adjacent protrusions are connected by the joint.

According to the present invention, the joint is provided between the mutually adjacent protrusions, and the height of the joint from the groove bottom is 1 mm or less. The protrusions are connected to each other through the joint, thereby improving the resistance to stone drilling. More specifically, the space between the adjacent protrusions is a valley formed by respective slopes of the protrusions. Therefore, when the stone trapped within the groove moves in the groove, the stone easily moves to the space therebetween. As a result, the stone is easy to penetrate the space, where stone drilling easily occurs. By providing the joint formed as a bump, protruding from the groove bottom outwardly in the tire radial direction, in this space, the occurrence of stone drilling can be minimized. Furthermore, since the joint is formed at the height of 1 mm or less, this hardly affects the capacity of the groove, and hence, reduction in snow traction performance can be suppressed even when the joint is provided. These allow further improvement of the resistance to stone drilling while the snow traction performance is ensured.

According to the present invention, the lands form a block pattern, the grooves intersect each other to form an intersection, and the protrusion main body is located at the intersection.

According to the present invention, since the protrusion main portion of the protrusion is located at the intersection of the grooves, the occurrence of stone drilling can be reduced. In other words, since the intersection of the grooves has a large opened area on the tread surface, a stone on the road surface easily enters the intersection when the pneumatic tire is rolling along the road surface. Therefore, by locating the protrusion main portion of the protrusion at the intersection, the stone having entered the intersection contacts the protrusion main portion, to be immediately ejected to the outside of the groove. This more reliably allows improvement of the resistance to stone drilling.

According to the present invention, the slope portion is formed in a plurality of directions along the grooves.

According to the present invention, the sloped portion is formed in the plurality of directions along the grooves that form the intersection. Therefore, if a stone is trapped within the groove near the intersection and the stone moves toward the intersection as the pneumatic tire rolls, the stone moves outwardly in the tire radial direction along the slope of the sloped portion while directing toward the intersection. Then, when the stone reaches a portion where there is the protrusion main portion, because the protrusion main portion is located at the intersection having the large opened area, the stone is easily ejected from the groove. As a result, the stone can be prevented from its penetration in the direction of the groove bottom. Therefore, by locating the protrusion main portion at the intersection, the stone drilling can be more definitely minimized. This more reliably allows improvement of the resistance to stone drilling.

According to the present invention, the lands form a block pattern, the grooves intersect each other, and the slope portion is bent from a first groove in which the protrusion main body connected with the slope portion is formed in a direction along a second groove that intersects the first groove.

According to the present invention, the protrusion, which is formed near the portion where the groove and another groove intersect each other, has the sloped portion that is bent in the direction of the another groove, and hence, even if the protrusion main portion is not located at the intersection, the stone trapped within the groove near the intersection becomes easy to contact the sloped portion that is bent. When the stone in contact with the sloped portion moves in the direction in which the groove is formed, the stone moves in the tire radial direction, thereby being easily ejected from the groove. This more reliably allows improvement of the resistance to stone drilling.

EFFECTS DUE TO THE INVENTION

The pneumatic tire according to the present invention is capable of improving the resistance to stone drilling while ensuring the snow traction performance.

BRIEF DESCRIPTION OF DRAWINGS

FIG. 17 is a diagram of results of performance evaluation tests on the pneumatic tire;
and
FIG. 18 is a diagram of results of performance evaluation tests on the pneumatic tire.

DESCRIPTION OF REFERENCE SIGNS

Figure 1:
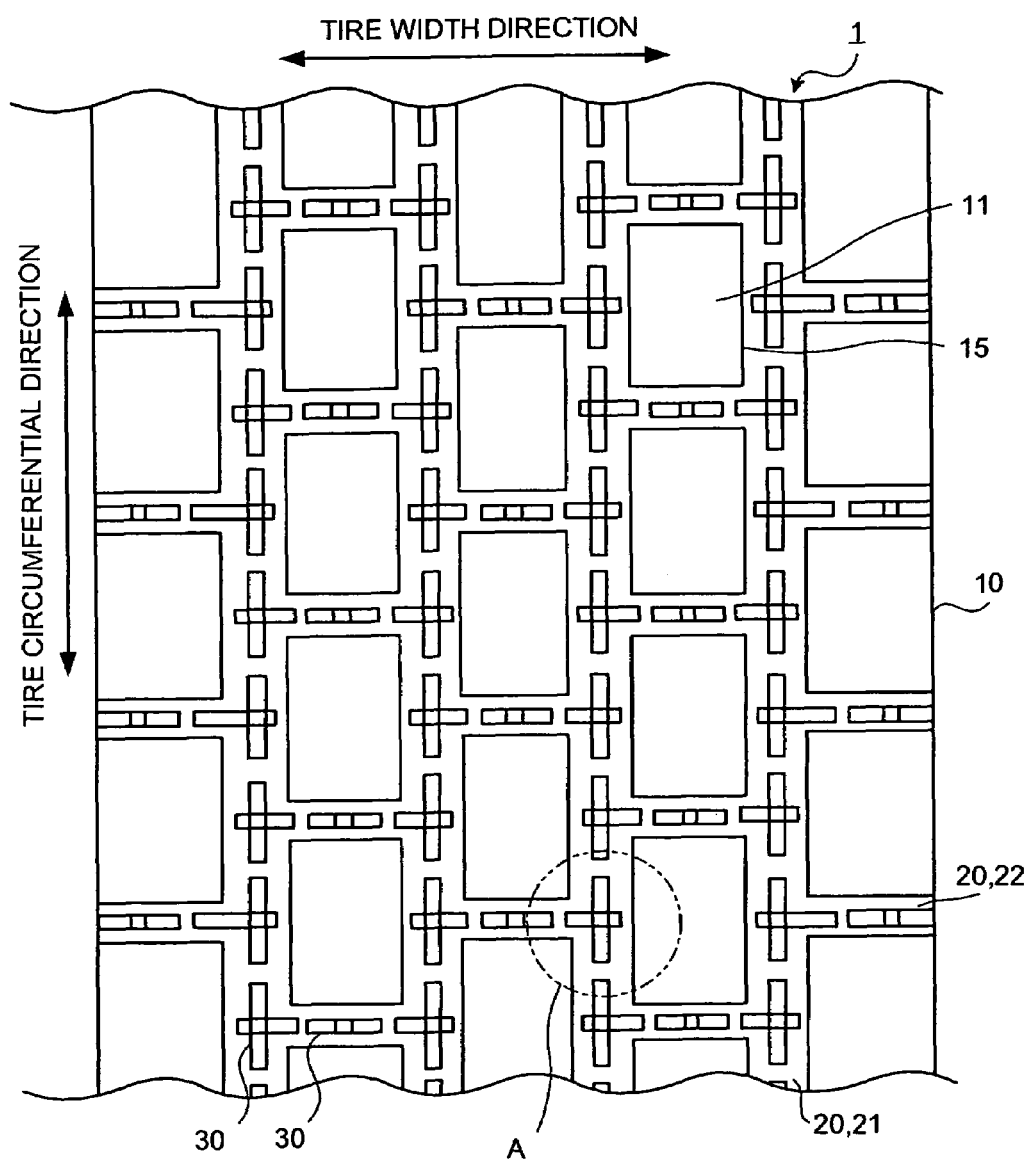
FIG. 1 is a diagram of a tread area of the pneumatic tire according to the present invention.

1 Pneumatic tire
10 Tread area
11 Tread surface
15 Block
20 Groove
21 Circumferential groove
22 Lateral groove
23 Groove wall
24 Groove bottom
25 Opening
26 Intersection
30 Protrusion
31 Protrusion main portion
32 Top portion
35 Sloped portion
36 Slope
37 Edge
40 Joint
50 Stone

BEST MODE(S) FOR CARRYING OUT THE INVENTION

Exemplary embodiments of a pneumatic tire according to the present invention are explained in detail below with reference to the attached drawings. It should be noted that the present invention is not limited by the embodiments. Components in the following embodiments include those easily replaceable by persons skilled in the art, or those substantially the same. Furthermore, the components in the following embodiments include those replaceable and easily made by the persons skilled in the art, or those substantially the same. The tread pattern of the pneumatic tire includes a block pattern, a rib pattern, and a rib-lug pattern, but in the following explanation, the pneumatic tire of which tread pattern is formed with the block pattern is explained as an example of the pneumatic tire according to the present invention.

Embodiments

In the following explanation, a tire width direction indicates a direction parallel to a tire rotating axis of the pneumatic tire, a tire radial direction indicates a direction orthogonal to the tire rotating axis, and a tire circumferential direction indicates a circumferential direction based on the tire rotating axis as a central axis. FIG. 1 is a diagram of a tread area of the pneumatic tire according to the present invention. A pneumatic tire 1 includes a tread area 10 formed on an outermost side thereof in the tire radial direction. When a vehicle (not shown) with the pneumatic tire runs, the surface of the tread area 10, namely, the portion of the pneumatic tire 1 contacting the road surface is formed as a tread surface 11. The tread area 10 is formed with a plurality of grooves 20 including grooves formed in predetermined directions. The grooves 20 includes a plurality of circumferential grooves 21 formed in the tire circumferential direction and a plurality of lateral grooves 22 formed in the tire width direction. The tread area 10 is divided by the circumferential grooves 21 and the lateral grooves 22 into a plurality of blocks 15, being lands. Protrusions 30 are arranged at intervals in the grooves 20 in such a manner that the protrusions 30 are provided in both the circumferential grooves 21 and the lateral grooves 22. The circumferential groove 21 and the lateral groove 22 are not necessarily formed accurately in the tire circumferential direction or the tire width direction. The circumferential groove 21 may be formed substantially in the tire circumferential direction, and hence, the circumferential groove 21 may be formed at a slant with respect to the tire width direction or formed with a curve. The lateral groove 22 may be formed substantially in the tire width direction, and hence, the lateral groove 22 may be formed at a slant with respect to the tire circumferential direction or formed with a curve.

Figure 2:
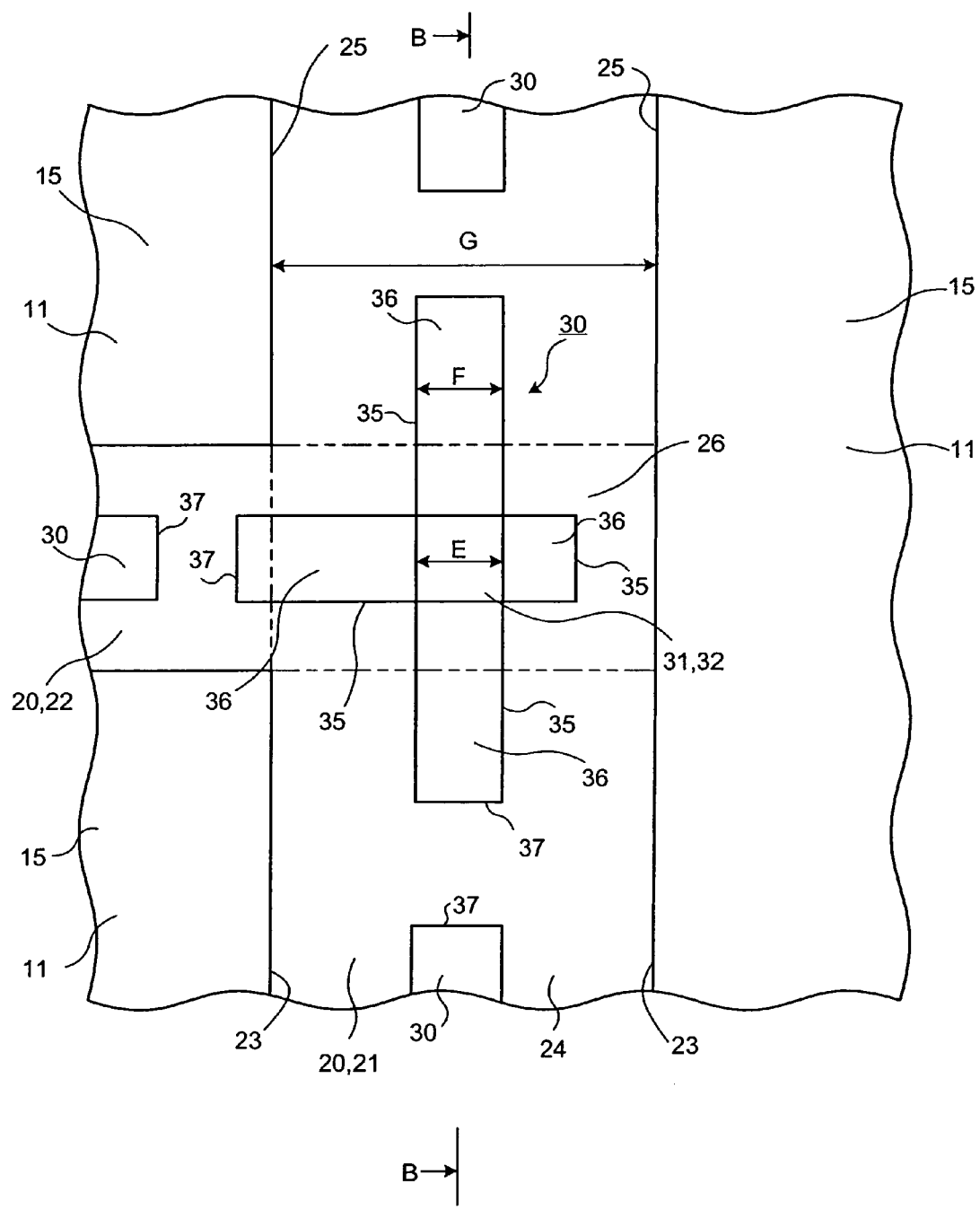
FIG. 2 is a detailed diagram of the portion A of FIG. 1.
Figure 3:
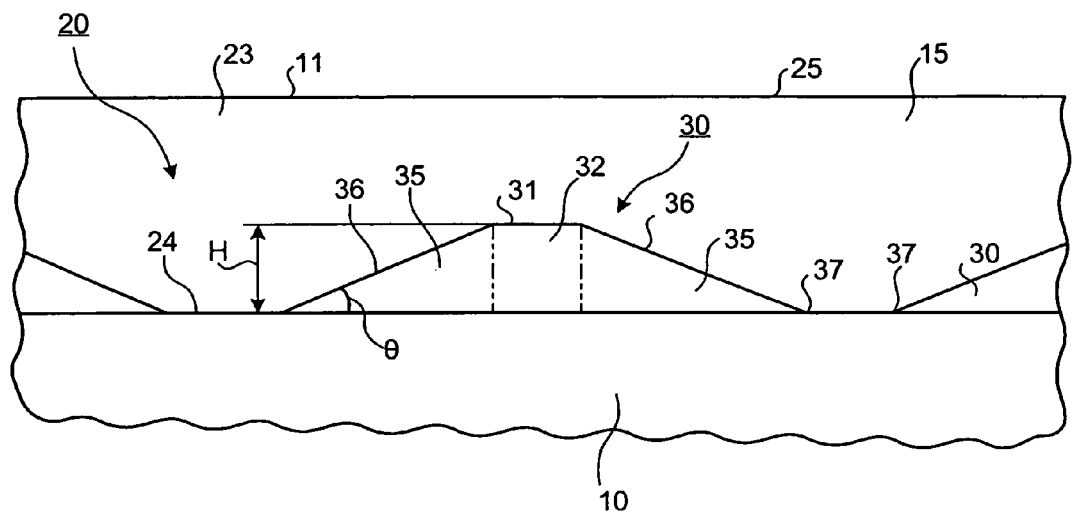
FIG. 3 is a cross-section taken along the line B-B of FIG. 2.
Figure 4:
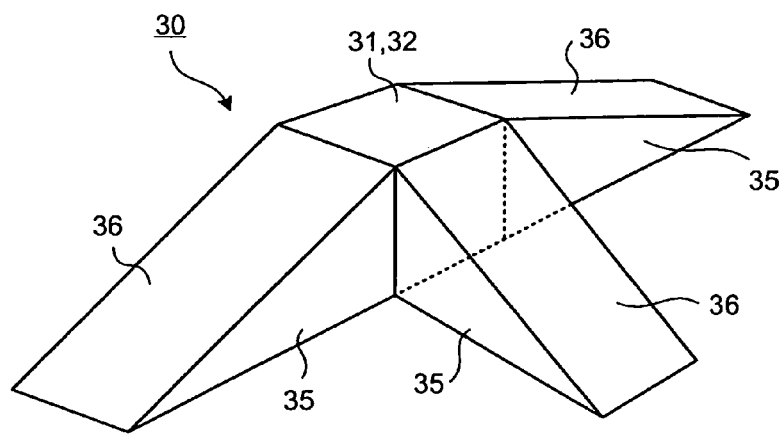
FIG. 4 is a perspective view of a protrusion.

FIG. 2 is a detailed diagram of the portion A of FIG. 1. FIG. 3 is a cross-section taken along the line B-B of FIG. 2. FIG. 4 is a perspective view of the protrusion. The protrusion 30 is formed apart from the blocks 15 or from groove walls 23 of the groove 20. The protrusion 30 is formed so as to protrude from a groove bottom 24 of the groove 20 outwardly in the tire radial direction, and is also formed at a height lower than a height of the block 15, namely, lower than the distance from the groove bottom 24 to the tread surface 11. The protrusion 30 thus formed includes a protrusion main portion 31 and a sloped portion 35. The protrusion main portion 31 and the sloped portion 35 are formed respectively to a substantially rectangle when the protrusion 30 is viewed in the depth direction of the groove 20. The protrusion main portion 31 has a top portion 32 which is the highest portion from the groove bottom 24, of portions of the protrusion 30. The sloped portion 35 is connected to the top portion 32, and has a slope 36 that is formed so that its height from the groove bottom 24 is getting lower with distance from the top portion 32 toward the direction parallel to the groove bottom 24. A height H of the top portion 32 is preferably ½ or less of the groove depth of the groove 20, or ½ or less of the height of the block 15, and the height from the groove bottom 24 is preferably 2 mm or more. Furthermore, a width E of the top portion 32 in the width direction of the groove 20 is formed preferably with a width of the groove 20. More specifically, the width E is formed preferably with a width in a range from 0.10 to 0.25 times of a width G of an opening 25 of the groove 20.

The slope 36 is formed so that an angle θ with the groove bottom 24 ranges from 3 to 60°. Further, the sloped portion 35 is formed in two directions mutually opposite to each other with respect to the protrusion main portion 31, at least along the groove 20. More specifically, the protrusion 30 formed in the circumferential groove 21 has the sloped portions 35 which are formed in two directions mutually opposite to each other with respect to the protrusion main portion 31, at least along the circumferential groove 21, or in two directions mutually opposite to each other along the tire circumferential direction. Further, the protrusion 30 formed in the lateral groove 22 has the sloped portions 35 which are formed in two directions mutually opposite to each other with respect to the protrusion main portion 31, at least along the lateral groove 22, or in two directions mutually opposite to each other along the tire width direction. The directions, in which the sloped portions 35 are formed, only have to be formed in two directions mutually opposite to each other with respect to the protrusion main portion 31, at least along the groove 20, and the sloped portion 35 may further be formed in directions other than the two directions. More specifically, the sloped portion 35 is preferably formed in three or more directions allowing for resistance to stone drilling, and the sloped portion 35 is preferably formed in four or less directions allowing for snow traction performance. Because the slope 36 is formed on the sloped portion 35, the slope 36 is formed by the same number as the number of the sloped portions 35. The angle θ of the slope 36 with respect to the groove bottom 24 is formed preferably at 30° or less.

A width F of the slope 36 of the sloped portion 35 is formed with almost the same width as the width E of the top portion 32 in the width F direction of the slope 36. Since the protrusions 30 are arranged at intervals in the grooves 20 in the above manner, both edges 37, which are the nearest portions of adjacent protrusions 30 to mutually opposite protrusions 30, are provided at a space. Furthermore, the protrusion 30 is also formed in an intersection 26 of the grooves 20, i.e., an intersection 26 which is a portion where the circumferential groove 21 and the lateral groove 22 intersect each other. The protrusion 30 is provided at the intersection 26 so that the protrusion main portion 31 is located at the intersection 26. The sloped portions 35 of the protrusion 30 located at the intersection 26 are preferably formed along the grooves 20 which form the intersection 26, namely, along both the circumferential groove 21 and the lateral groove 22. Therefore, the sloped portions 35 of the protrusion 30 of which the protrusion main portion 31 is located at the intersection 26 are preferably provided in three or more directions along the circumferential-groove 21 and the lateral groove 22.

Figure 5:
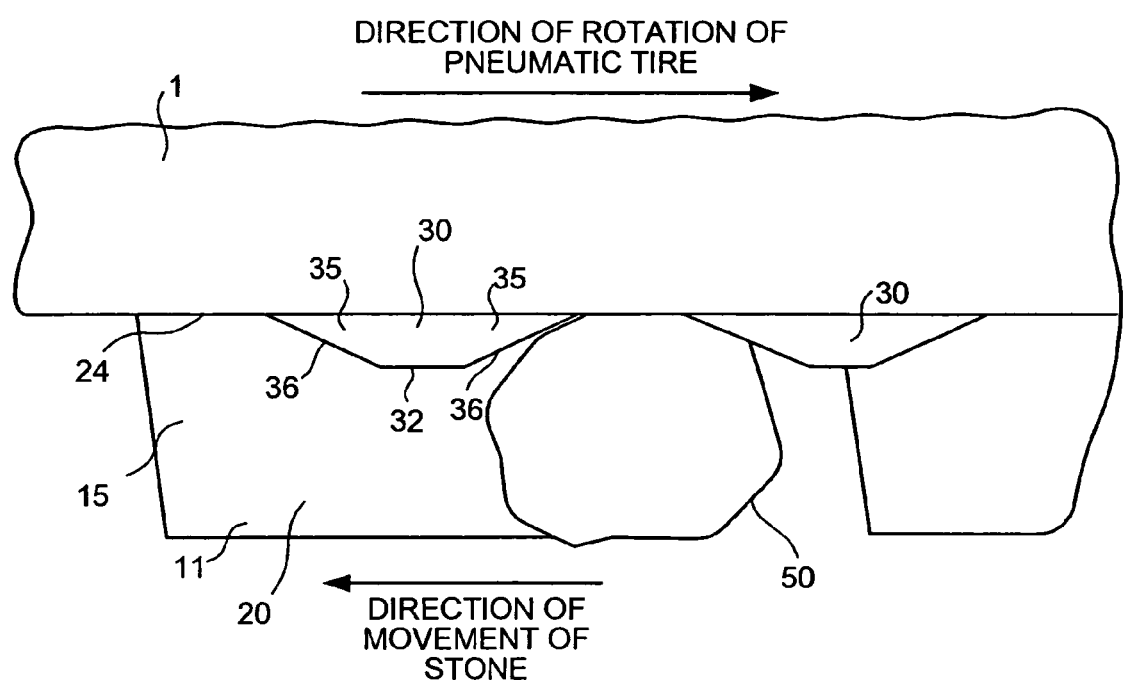
FIG. 5 is a cross-section of how a stone is trapped within the groove of the pneumatic tire.
Figure 6:
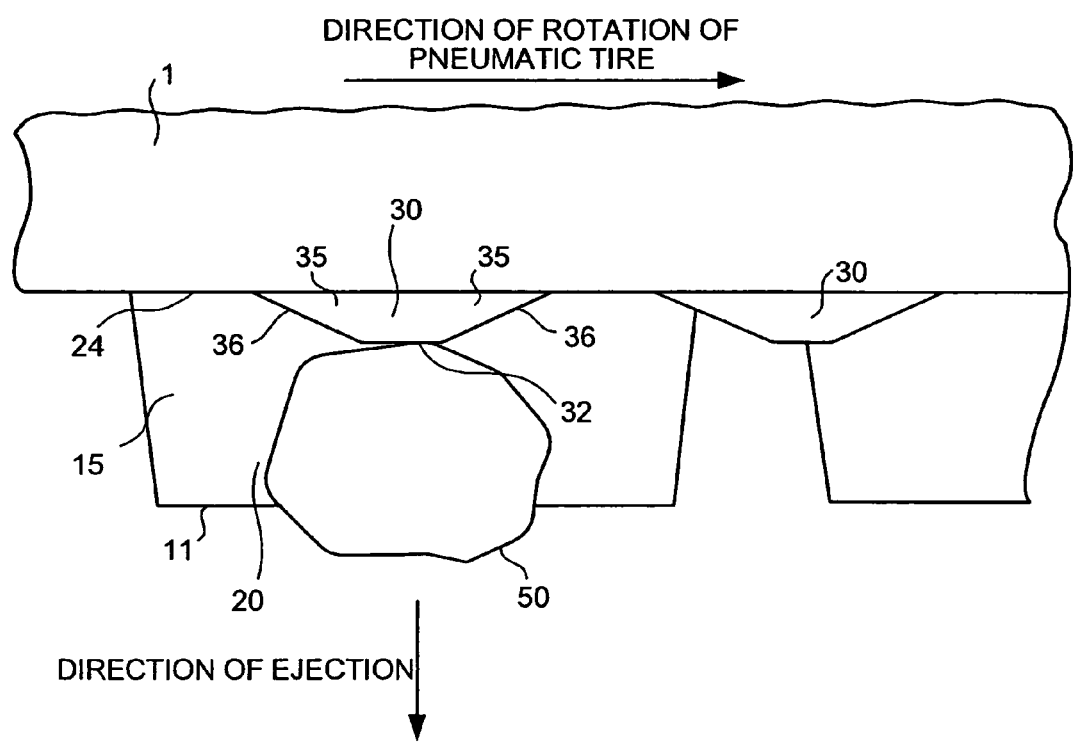
FIG. 6 is a diagram of how the stone of FIG. 5 moves.

FIG. 5 is a cross-section of how a stone is trapped within the groove of the pneumatic tire. FIG. 6 is a diagram of how the stone of FIG. 5 moves. When the vehicle with the pneumatic tire 1 runs, the pneumatic tire 1 rotates while a lower part of the tread surface 11 is contacting the road surface (not shown). At this time, there are sometimes stones 50 on the road surface. If the groove 20 passes through the road surface where there are the stones 50, the stones 50 may enter the groove 20 and may sometimes be trapped within the groove 20. If the stones 50 are trapped within the groove 20 in this manner, then the stones 50 contact the road surface through rotation of the pneumatic tire 1, and hence, the stones 50 may be pushed inwardly in the tire radial direction. The stones 50 pushed inwardly in the tire radial direction are made in contact with the groove bottom 24 or the protrusions 30.

When the vehicle is running, the pneumatic tire 1 rotates even in this state. Therefore, the stone 50 that is pushed out of the groove 20 due to its size which is greater than the depth of the groove 20, that is, the stone 50, protruding from the tread surface 11 outwardly in the tire radial direction, contacts the road surface when the stone 50 is made to be on the road surface side by rotation of the pneumatic tire 1. At this time, frictional force acts between the stone 50 contacting the road surface, and the road surface. Further, because the pneumatic tire 1 is rotating, the stone 50 moves in the opposite direction to the rotation direction of the pneumatic tire 1, in the groove 20 along the direction in which the groove 20 is formed. The protrusions 30 are arranged at intervals in the groove 20, and the protrusion 30 has the sloped portions 35. Each of the sloped portions 35 has the slope 36, and the slope 36 is connected to the top portion 32 which is the highest portion from the groove bottom 24, of portions of the protrusion 30. Therefore, when contacting the slope 36 of the protrusion 30, the stone 50 moves along the direction in which the groove 20 is formed, thereby moving along the slope 36, and hence, the stone 50 moves toward the top portion 32. More specifically, the stone 50 moving in the groove 20 moves in the direction along which the groove 20 is formed, and also moves outwardly in the tire radial direction. When the stone 50 reaches the position of the top portion 32, a large part of the stone 50 is exposed from the groove 20, and a part trapped within the groove 20 decreases. Thus, the stone 50 is ejected to the outside of the groove 20. As a result, penetration of the stone 50 into the tread area 10 such as the groove bottom 24 can be suppressed, namely, the occurrence of stone drilling can be minimized.

The case, where the stone 50 trapped within the groove 20 moves by rotation of the pneumatic tire 1 in the direction in which the groove 20 is formed, indicates the case where the stone 50 is trapped mainly within the circumferential groove 21. However, in the case of forming the lateral groove 22 in a slanting direction, or in the case of cornering, the stone 50 trapped within the lateral groove 22 may sometimes move along the direction in which the groove 20 is formed when the pneumatic tire 1 rotates. Therefore, in either of the cases where the groove 20 trapping the stone 50 is the circumferential groove 21 and is the lateral groove 22, the stone 50 moves along the direction in which the groove 20 is formed, and the protrusion 30 causes the stone 50 to move outwardly in the tire radial direction, to be ejected to the outside of the groove 20. Thus, the occurrence of stone drilling can be minimized.

When the vehicle with the pneumatic tire 1 runs on the snowy road, the pneumatic tire 1 rotates while pushing the snow aside. At this time, the snow pushed aside enters the grooves 20. The groove 20 includes the protrusions 30, which are formed at intervals and are apart from the blocks 15.

Therefore, the groove 20 has a lot of space therein, and predetermined capacity is ensured in the groove 20. Therefore, much of the snow pushed aside enters the grooves 20. In this manner, when the vehicle with the pneumatic tire 1 runs on the snowy road, much of the snow pushed aside by the pneumatic tire 1 enters the grooves 20. Consequently, the pneumatic tire 1 can obtain drive force, i.e., snow traction on the snowy road. As the result of these, by providing the protrusions 30 in the grooves 20, the resistance to stone drilling can be improved while the snow traction performance is ensured. Even if the vehicle with the pneumatic tire 1 runs not on the snowy road but on a muddy road, a lot of mud enters the grooves 20, thereby obtaining traction.

Since the stone 50 trapped within the groove 20 can be ejected to the outside of the groove 20 by the protrusion 30, the protrusion 30 can be prevented from being damaged and chipped. Therefore, even if the vehicle with the pneumatic tire 1 runs and the tread area 10 is thereby worn, the protrusion 30 remains in the groove 20, and thereby the stone 50 trapped within the groove 20 can be ejected to the outside of the groove 20 even if it is further worn. As the result of this, even if the tread area 10 is further worn, the occurrence of stone drilling can be minimized, and the resistance to stone drilling can be improved over the long time.

Since the protrusion 30 is formed in such a manner that its height from the groove bottom 24 to the top portion 32 is 2 mm or more, a bump can more surely provided in the groove bottom 24 in the tire radial direction, and the position of the top portion 32 can be more accurately located outwardly in the tire radial direction with respect to the groove bottom 24. In other words, the top portion 32 can be more surely made closer to the tread surface 11. This allows the stone 50 trapped within the groove 20 to be more reliably moved outwardly in the tire radial direction, and easily ejected to the outside of the groove 20. As a result, the resistance to stone drilling can be more reliably improved.

Figure 7:
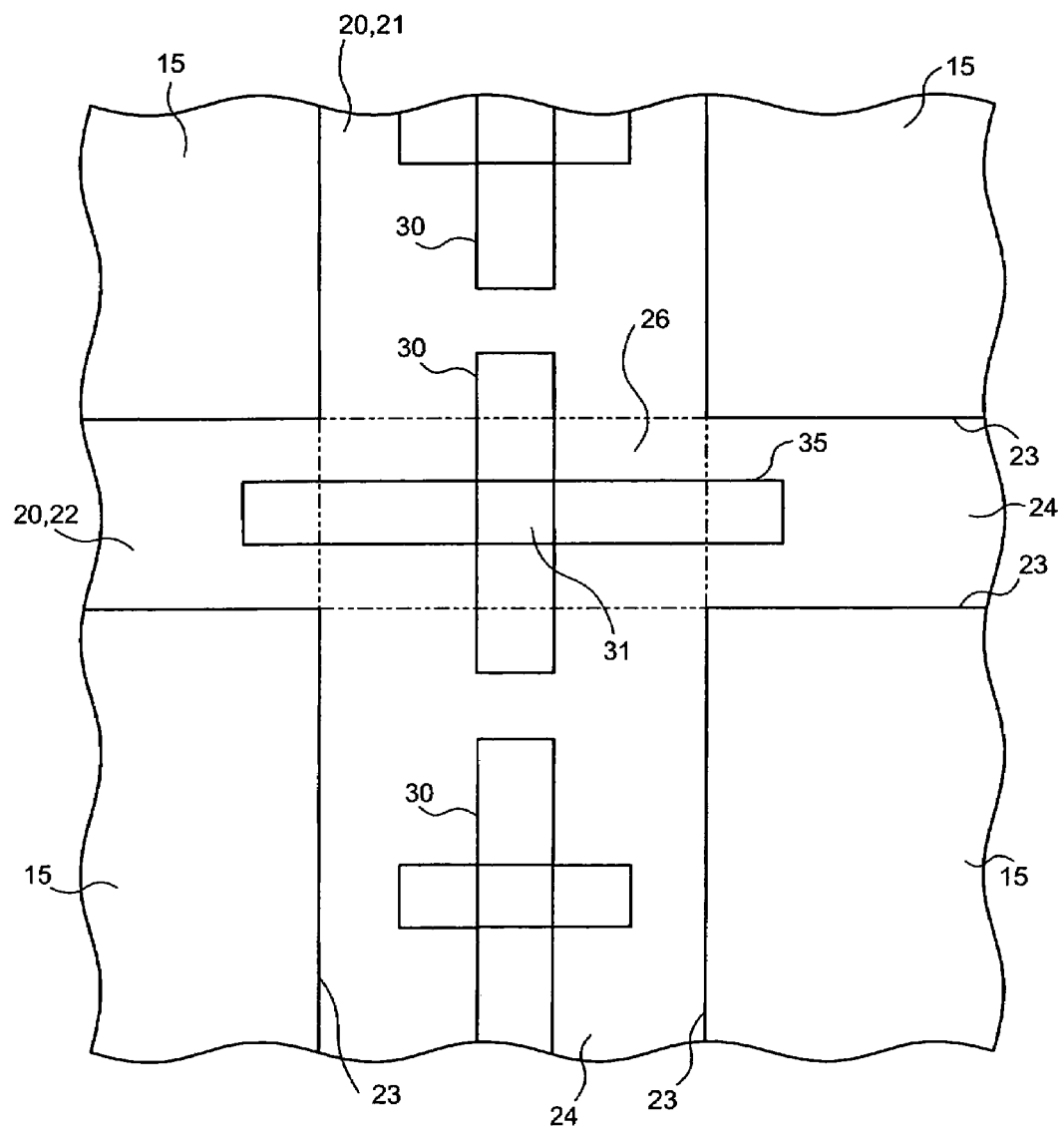
FIG. 7 is a diagram of a modification of FIG. 1.

FIG. 7 is a diagram of a modification of FIG. 1. The pneumatic tire 1 of which tread pattern is the block pattern has the intersections 26. Since each of the intersections 26 is a portion where a plurality of grooves 20 intersects each other, the stone 50 easily enters the portion. Therefore, the stone 50 is easily trapped within the groove 20 and the stone drilling easily occur. By providing the protrusion 30 in the groove 20 of the pneumatic tire 1 having the block pattern, the stone drilling which may possibly occur in the pneumatic tire 1 can be minimized. As a result, the protrusion 30 can be used more efficiently. The intersection 26 may be any form of intersection if a plurality of grooves 20 intersects each other. That is, it includes the intersection 26 as shown in FIG. 2 such that one groove 20 intersects another groove 20 so as to abut against the another groove 20, for example, the intersection 26 such that the lateral groove 22 intersects the circumferential groove 21 so as to abut against the circumferential groove 21, and the intersection 26 as shown in FIG. 7 such that a plurality of grooves 20 fully intersect each other.

The stone 50 easily enters the intersection 26 as explained above. However, by locating the protrusion main portion 31 of the protrusion 30 at the intersection 26, the stone 5 can be prevented from entering the intersection 26. Furthermore, by providing the protrusion main portion 31 at the intersection 26, even if the stone 50 is trapped within the groove 20 near the sloped portion 35 which is included in the protrusion 30 and formed along the groove 20, the stone 50 moves inside the groove 20 as far as the protrusion main portion 31. If another stone 50 is present at the intersection 26, the stone 50 causes the another stone 50 to move outwardly in the tire radial direction. Since the grooves 20 intersect each other at the intersection 26, the groove walls 23 within which the stone 50 is trapped are not many, and hence, the stone 50 moves toward the intersection 26. When moving outwardly in the tire radial direction, the stone 50 reaches an outward portion, where there are not many groove walls 23, in the tire radial direction. Consequently, the stone 50 can be more surely ejected to the outside of the groove 20. These more reliably allow minimization of the stone drilling, thereby more definitely improving the resistance to stone drilling.

Figure 8:
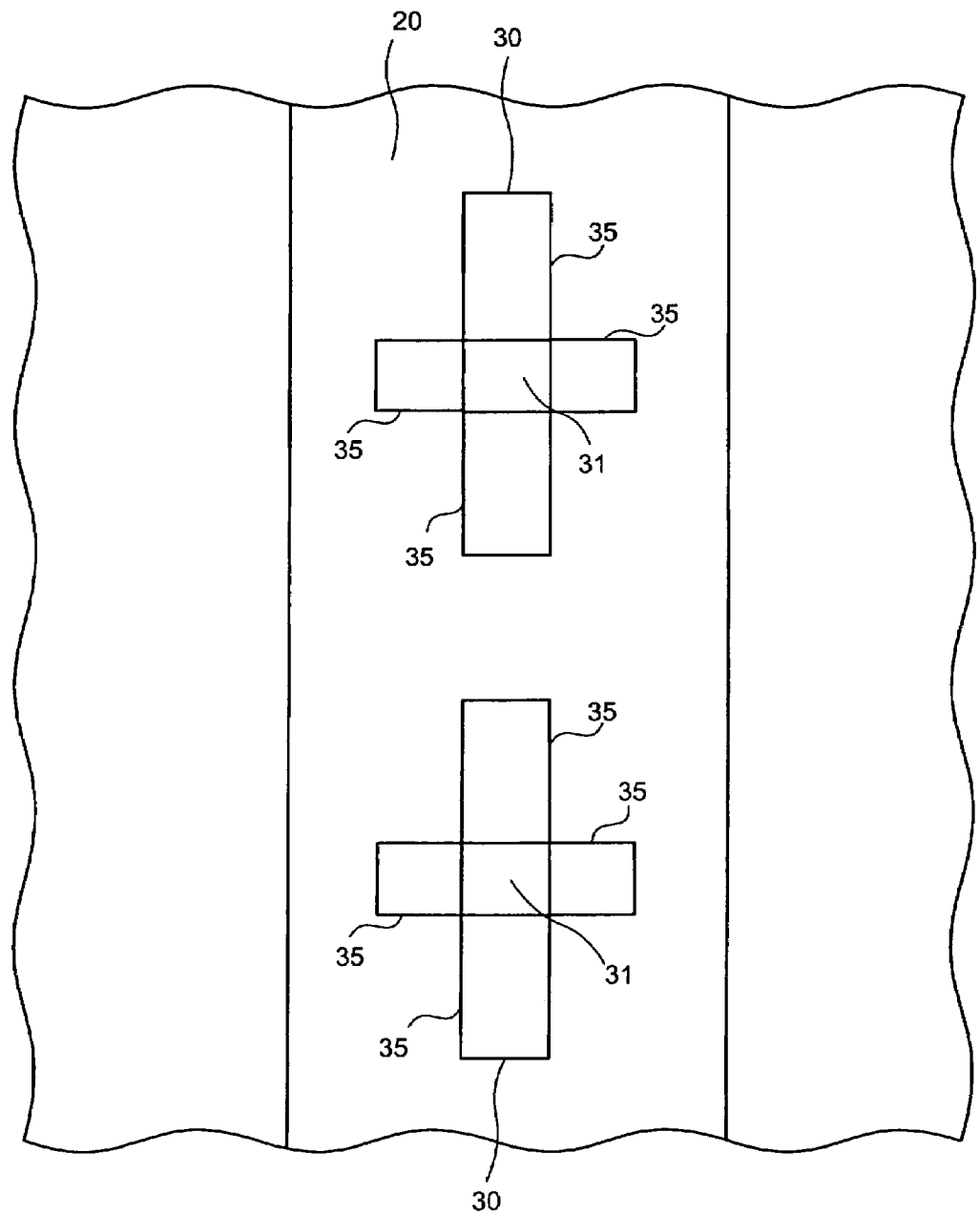
FIG. 8 is a diagram of a modification of protrusions provided in the groove other than an intersection.
Figure 9:
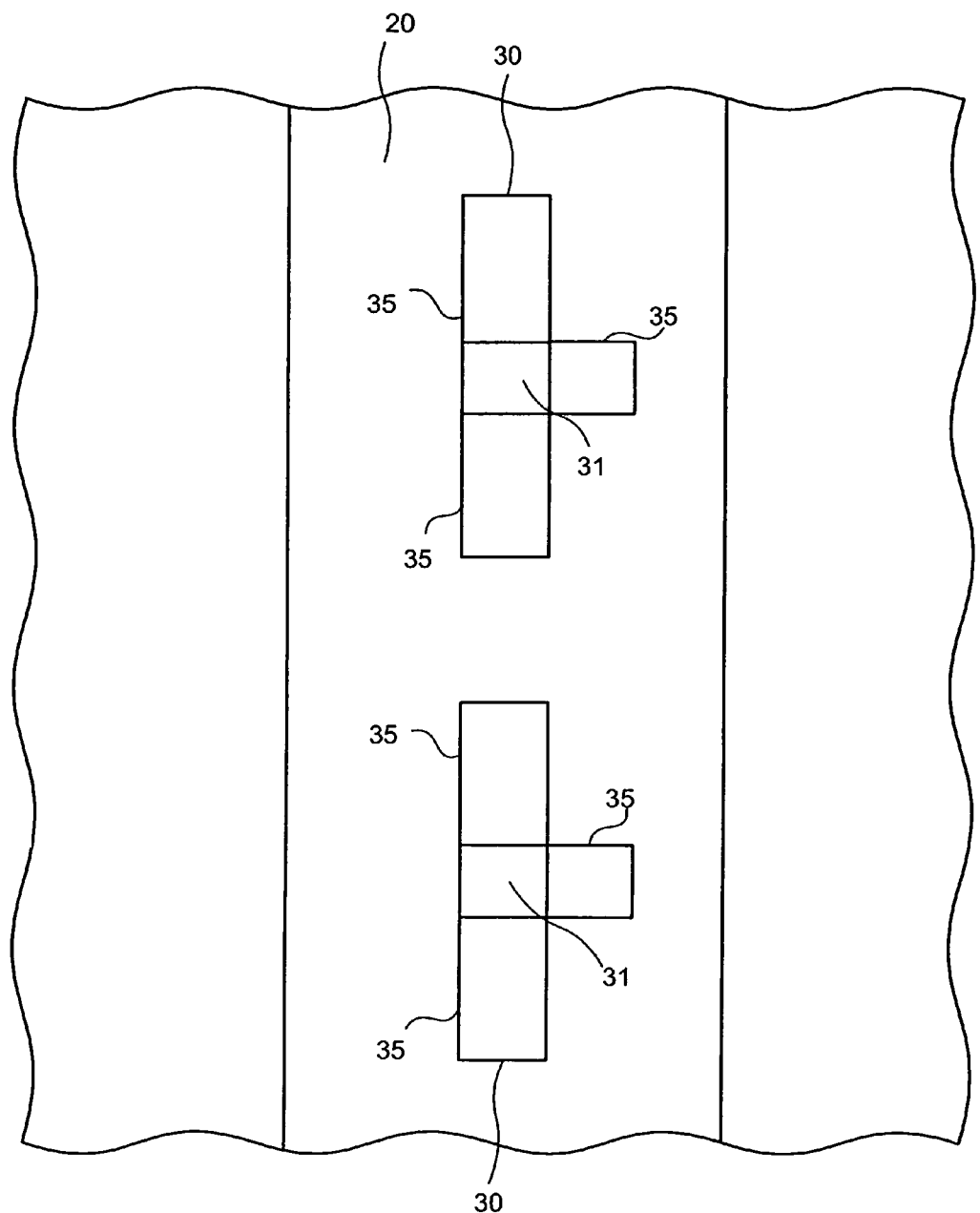
FIG. 9 is a diagram of another modification of the protrusions provided in the groove other than an intersection.

FIGS. 8 and 9 are diagrams of modifications of the protrusion provided in the groove other than the intersection. The protrusion 30 may be formed in a portion other than the intersection 26 or may have the sloped portions 35 in three or more directions. For example, in a pneumatic tire having the block pattern as the pneumatic tire 1 where the protrusion 30 is formed in a portion with a large space from the intersection 26 to the intersection 26, the sloped portion 35 may be provided in the direction orthogonal to the direction in which the groove 20 is formed, other than the direction in which the groove 20 is formed (FIG. 8). Furthermore, since the sloped portion 35 only has to be provided in two directions at least along the groove 20, the sloped portion 35 may be provided in any direction(s) other than the directions along the groove 20, or may be provided in one direction (FIG. 9). By providing the sloped portion 35 in the direction(s) other than the directions along the groove 20 in the above manner, the stone 50 can be moved more reliably in the direction of the top portion 32, and the protrusion 30 can also be reinforced. Therefore, even if the stone 50 trapped within the groove 20 applies the load to the protrusion 30, the protrusion 30 can be prevented from being crushed, and the distortion of the protrusion 30 due to the load applied by the stone 50 can be minimized. Therefore, the stone 50 can be more reliably ejected to the outside of the groove 20, which allows further minimization of the stone drilling. As the result of this, the resistance to stone drilling can be more definitely improved.

Figure 10:
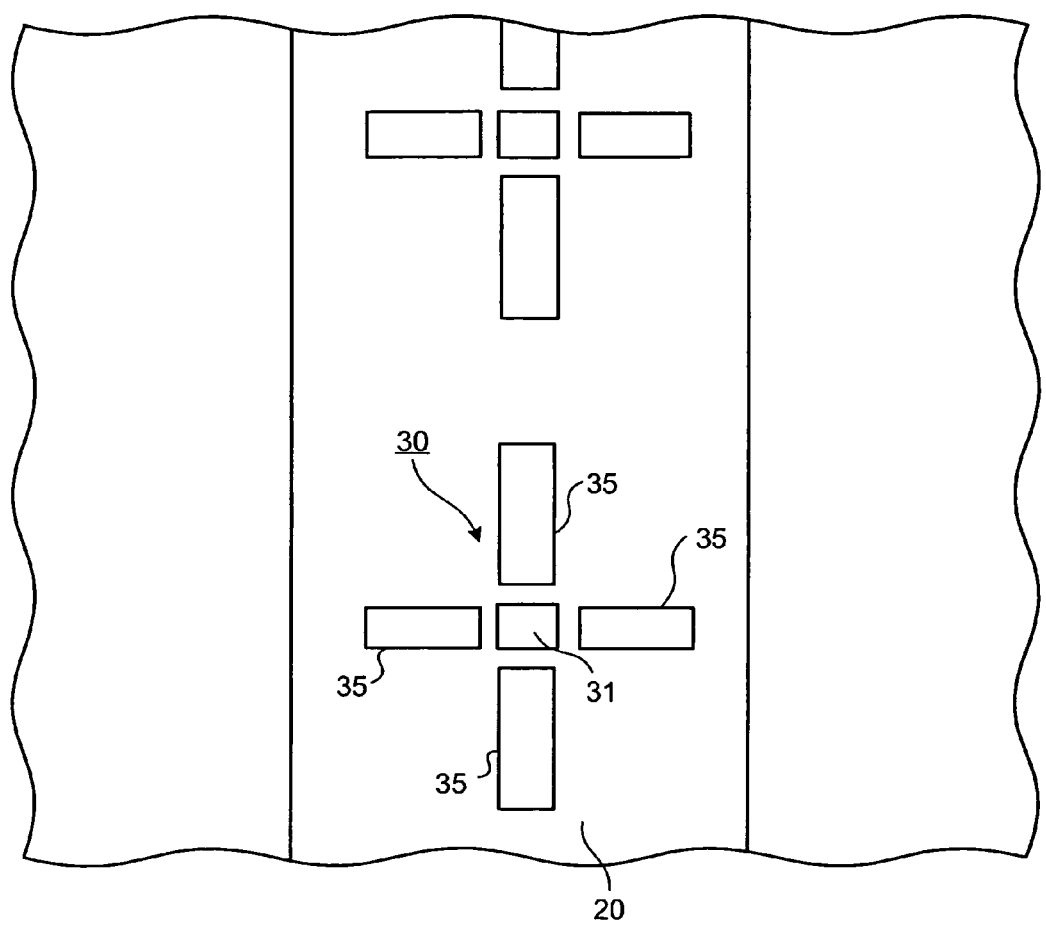
FIG. 10 is a diagram of how a protrusion main portion and a sloped portion are separated from each other.

FIG. 10 is a diagram of how the protrusion main portion and the sloped portion are separated from each other. Although the protrusion 30 includes the protrusion main portion 31 and the sloped portion 35 which are integrated into one unit, the protrusion main portion 31 and the sloped portion 35 may be separated from each other if separation is provided only slightly. If it is slight, even if the protrusion main portion 31 and the sloped portion 35 are separated, the resistance to stone drilling can be improved while the snow traction performance is ensured. Furthermore, by separating the protrusion main portion 31 from the sloped portion 35, the capacity of the groove 20 can be increased more, and hence, the snow traction performance can be further improved. The separation is provided not only between the protrusion main portion 31 and each of the sloped portions 35, but the separation may be provided so that the protrusion main portion 31 is separated into two parts at a slight interval therebetween, or may be provided so that one of the sloped portions 35 is separated from the protrusion main portion 31 at a slight interval therebetween.

Figure 11:
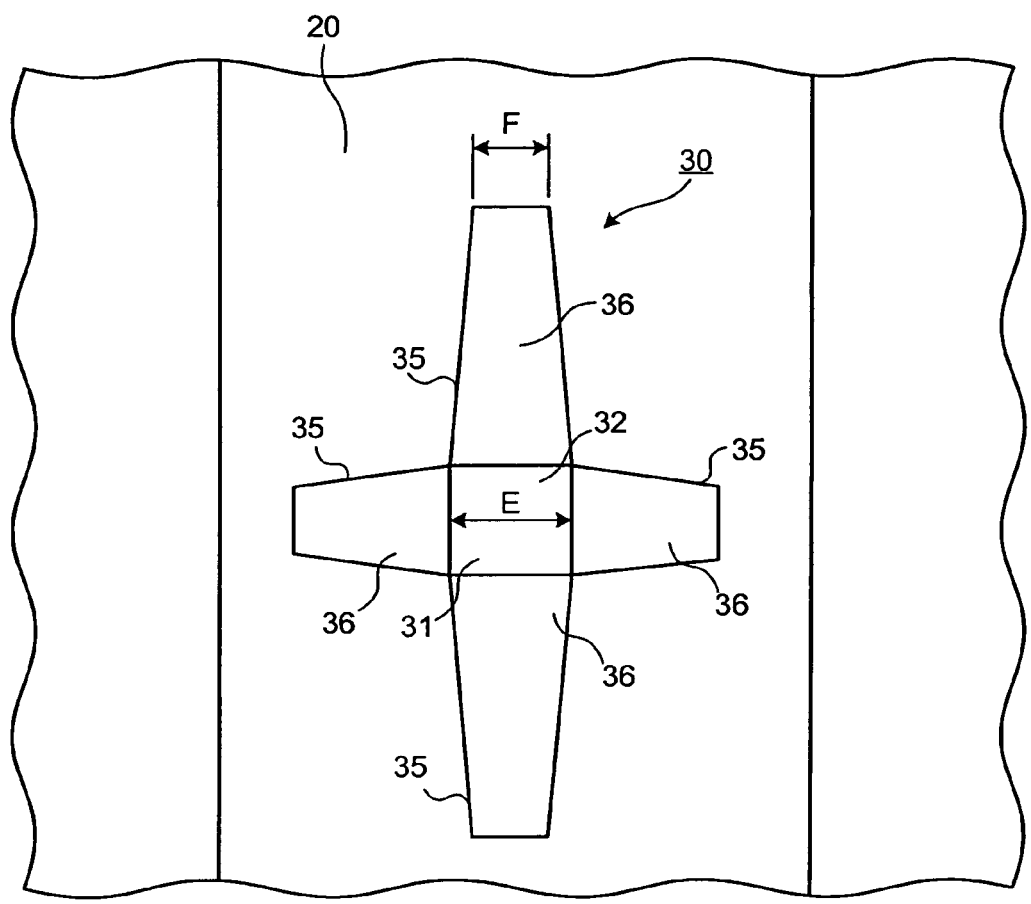
FIG. 11 is a diagram of how the width of a slope is narrower than the width of a top portion.
Figure 12:
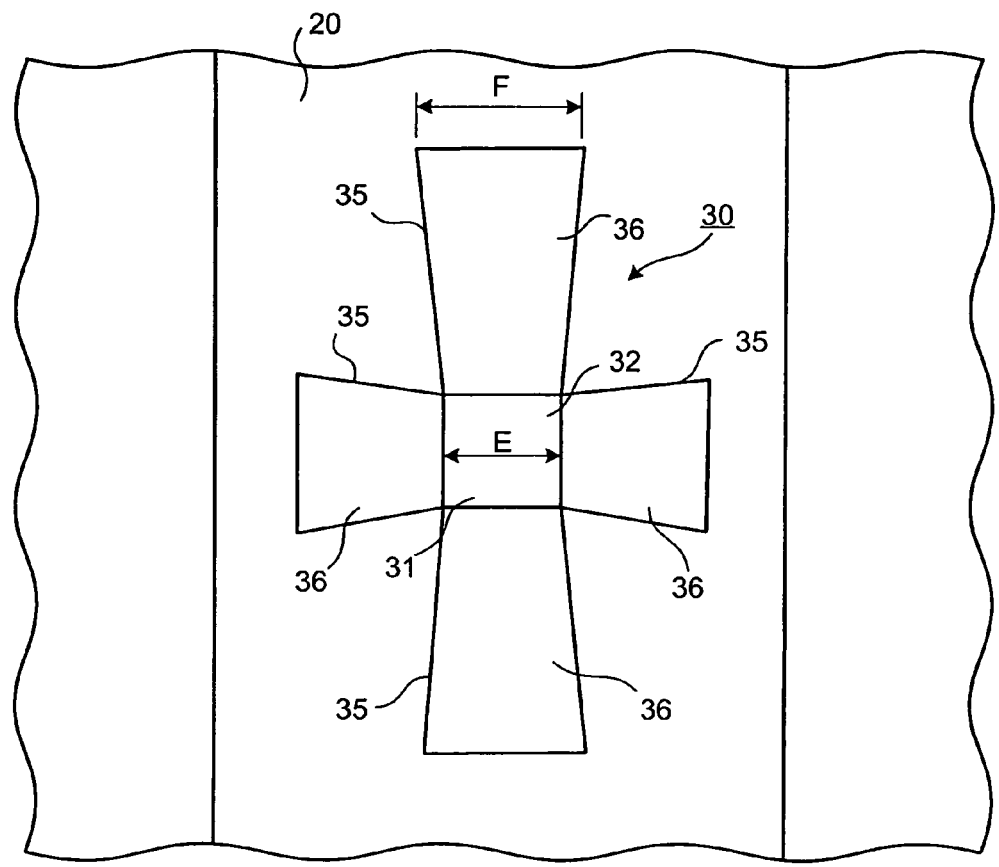
FIG. 12 is a diagram of how the width of a slope is wider than the width of a top portion.

FIG. 11 is a diagram of how the width of the slope is narrower than the width of the top portion. FIG. 12 is a diagram of how the width of the slope is wider than the width of the top portion. In the above explanation, the width F of the slope 36 is formed with almost the same width as the width E of the top portion 32 in the width F direction of the slope 36, but the width F of the slope 36 and the width E of the top portion 32 may be differently formed. For example, if the snow traction performance is desired to be emphasized, the capacity of the groove 20 is increased, so that much more snow on the road surface is allowed to enter the grooves 20, thereby pushing much more snow aside. Accordingly, the snow traction performance can be improved. Therefore, when the snow traction performance is emphasized, the width F of the slope 36 is made narrower than the width E of the top portion 32 (FIG. 11). This allows an increase in the capacity of the groove 20.

If the resistance to stone drilling is desired to be emphasized, by increasing the width of the slope 36, the slope 36 easily contacts the stone 50 trapped within the groove 20, thereby easily ejecting the stone 50 outside the groove 20. Accordingly, the resistance to stone drilling can be improved. Therefore, when the resistance to stone drilling is emphasized, the width F of the slope 36 is made wider than the width E of the top portion 32 (FIG. 12). Consequently, the stone 50 trapped within the groove 20 can easily contact the slope 36, and can be easily ejected to the outside. Based on the results of these, the width F of the slope 36 is changed with respect to the width E of the top portion 32 according to use situations, which allows improvement of the snow traction performance or of the resistance to stone drilling.

If the width F of the slope 36 is too narrow, the stone 50 does not easily come in contact with the slope 36, and hence, it becomes difficult to eject the stone 50 to the outside. Therefore, the resistance to stone drilling may be difficult to be improved. While if the width F of the slope 36 is too wide, the capacity of the groove 20 becomes too small, and hence, the snow traction performance may be difficult to be ensured. Based on the results, the width F of the slope 36 is preferably formed in a range from 0.7 to 1.1 times of the width E of the top portion 32.

Figure 13:
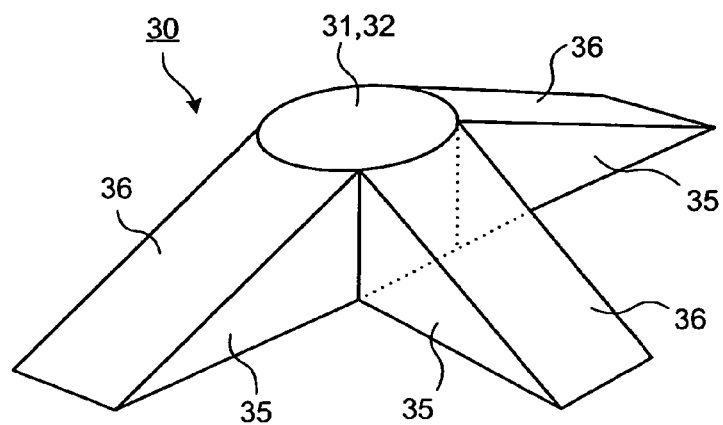
FIG. 13 is a perspective view of a protrusion of which top portion is an almost circle, when viewed from the depth direction of the groove.

FIG. 13 is a perspective view of the protrusion of which top portion is an almost circle, when viewed from the depth direction of the groove. The respective shapes of the protrusion main portion 31 and the sloped portion 35 of the protrusion 30 are almost rectangles, when viewed from the depth direction of the groove 20, but the shapes of the protrusion main portion 31 and the sloped portion 35 may be any shape other than the rectangle. For example, when viewed from the depth direction of the groove 20, the shape of the top portion 32 may be an almost circle. Even if the top portion 32 is formed into such a shape, the stone 50 trapped within the groove 20 can be ejected to the outside and the capacity of the groove 20 can be increased if the height H and the width E of the top portion 32 are formed in the above manner and if the sloped portion 35 includes the slope 36 which is formed with the width E and at the angle θ. Thus, the resistance to stone drilling can be improved while the snow traction performance is ensured.

Figure 14:
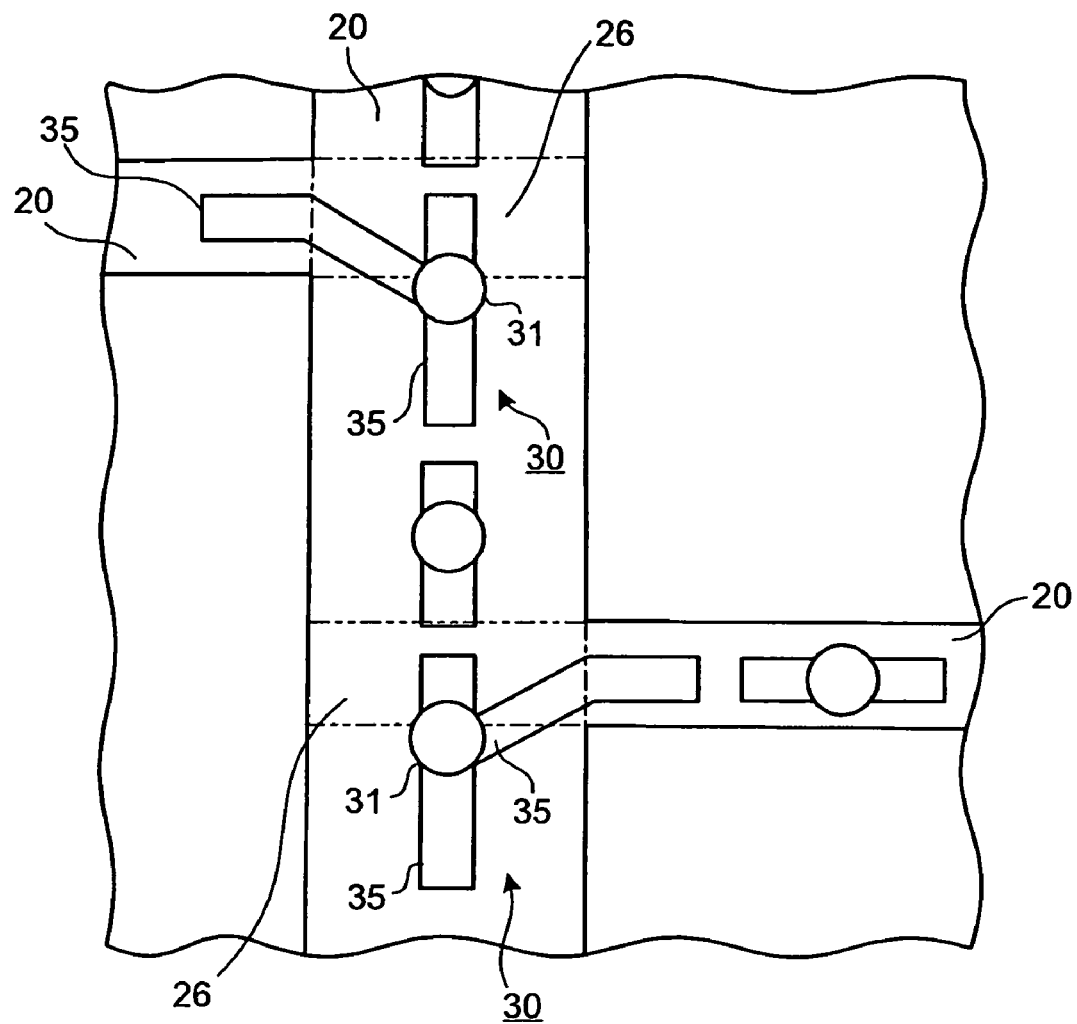
FIG. 14 is a diagram of a modification of a protrusion near the intersection.

FIG. 14 is a diagram of a modification of a protrusion near the intersection. In the above explanation, the protrusion 30 located at the intersection 26 of the grooves 20 is formed so that the protrusion main portion 31 is located at the intersection 26. However, even in the protrusion 30 located at the intersection 26, the protrusion main portion 31 may be formed in a portion other than the intersection 26. For example, the protrusion 30 may be located in such a manner that the protrusion main portion 31 is located in a portion deviating from the intersection 26, that the sloped portion 35 is connected to the protrusion main portion 31 but is bent at the middle thereof, and that the bent portion is formed in the direction along which another groove 20 is formed, the another groove 20 intersecting the groove 20 where the protrusion main portion 31 is formed. Even if the protrusion main portion 31 is not located at the intersection 26, if the sloped portion 35, formed in the direction along which the another groove 20 is formed, is connected to the protrusion main portion 31, the protrusion main portion 31 is not necessarily located at the intersection 26. When the sloped portion 35, formed in the direction along which the another groove 20 is formed, is connected to the protrusion main portion 31, the stone 50 trapped within the groove 20 is moved outwardly in the tire radial direction by the sloped portion 35, and is ejected, at the portion of the protrusion main portion 31, to the outside of the groove 20. This allows improvement of the resistance to stone drilling.

Figure 15:
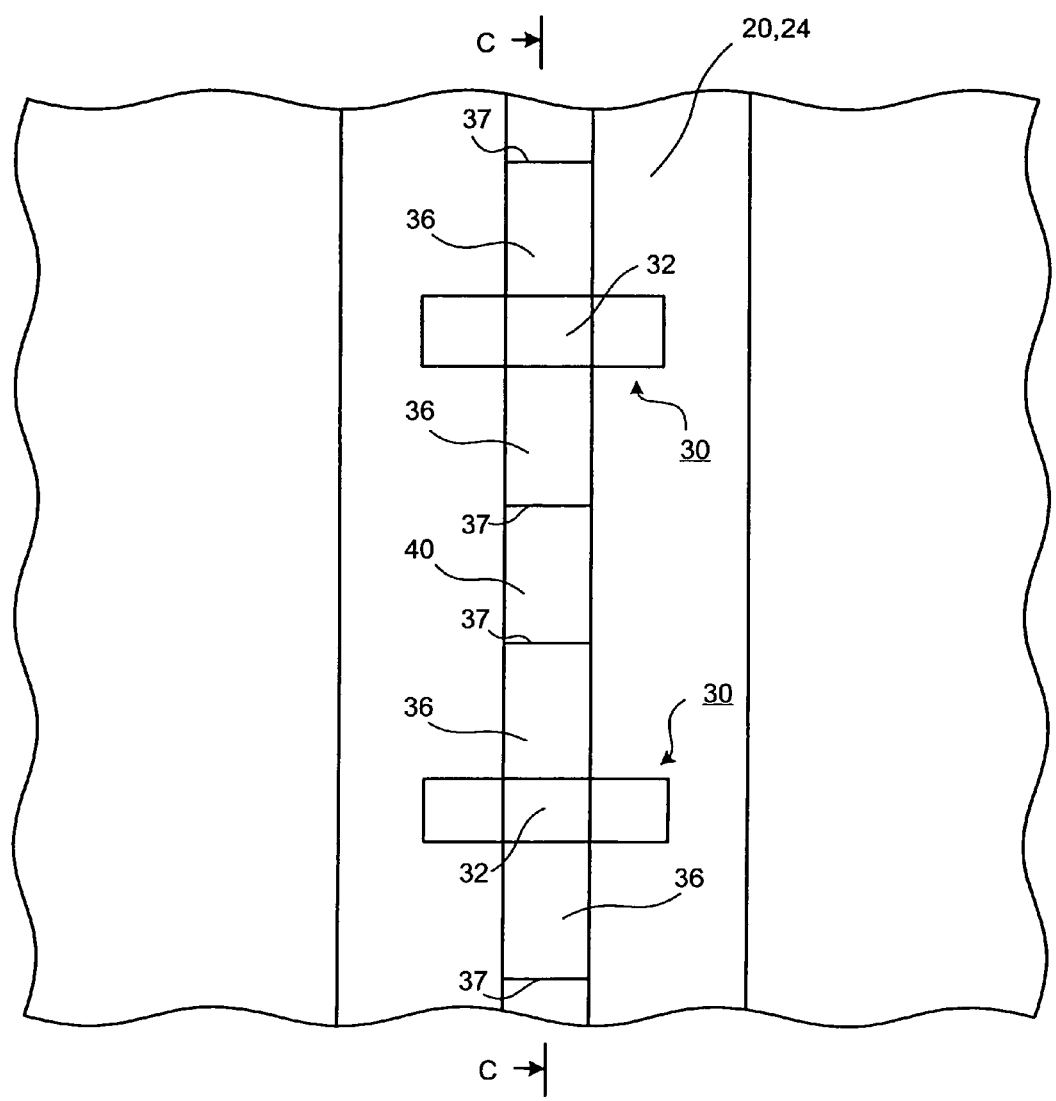
FIG. 15 is a diagram of how a protrusion is connected to a joint formed in a space between the protrusion and the adjacent protrusion.
Figure 16:
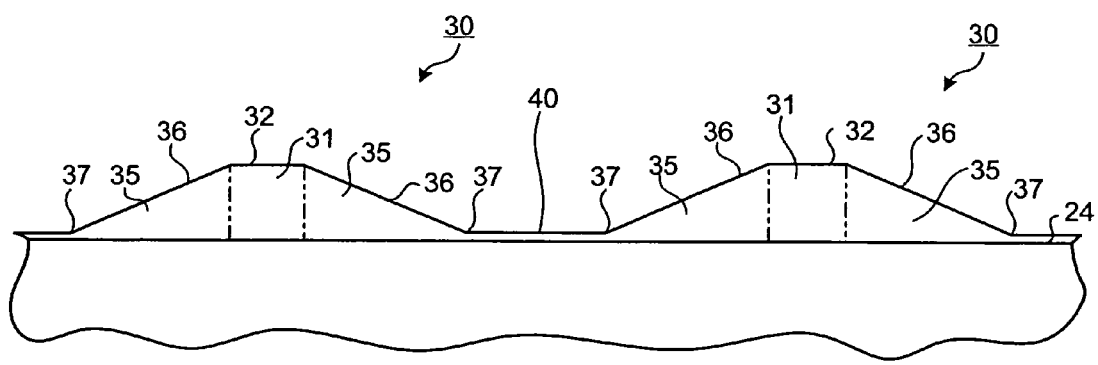
FIG. 16 is a cross-section taken along the line C-C of FIG. 15.

FIG. 15 is a diagram of how the protrusion is connected to a joint formed in a space between the protrusion and the adjacent protrusion. FIG. 16 is a cross-section taken along the line C-C of FIG. 15. The protrusion 30 is formed in plurality, and the protrusions 30 are discretely formed, but a joint 40, which is formed at a height of 1 mm or less from the groove bottom 24, may be provided between the mutually adjacent protrusions 30, to connect the protrusions 30 to the joint 40. In other words, the respective edges 37 of the mutually adjacent protrusions 30 may be connected to the joint 40. The space between the mutually adjacent protrusions 30 is valley-shaped formed by their respective slopes 36. Therefore, when the stone 50 trapped within the groove 20 is moving in the direction along which the groove 20 is formed while the load is applied to the stone 50 inwardly in the tire radial direction, the stone 50 is easily moved to the space between the protrusions 30. This causes stone drilling to easily occur between the mutually adjacent protrusions 30, but by providing the joint 40 in this space as a bump protruding from the groove bottom 24 outwardly in the tire radial direction, the occurrence of stone drilling can be minimized. Furthermore, by forming the joint 40 at the height of 1 mm or less, the joint 40 can be provided with little influence on the capacity of the groove 20. Therefore, even if such a joint 40 as explained above is provided, reduction in the snow traction performance can be prevented. These allow further improvement of the resistance to stone drilling while the snow traction performance is ensured.

Examples

Performance evaluation tests conducted on a conventional pneumatic tire 1 and the pneumatic tire according to the present invention are explained below. The performance evaluation test was conducted on two items, the resistance to stone drilling and the snow traction performance.

The test was conducted in a method of fitting the pneumatic tire 1 of 11R22.5 size having the block pattern to the rim to be attached to the drive shaft of a 2-D vehicle, and performing test runs. A method of evaluating test items was implemented in the following manner. In the test on the resistance to stone drilling, the vehicle was caused to run along a fixed course including 80% of paved road and 20% of unpaved road until the pneumatic tire 1 was fully worn out, and then the number of stone drillings occurring in the tread area 10 thereafter was evaluated using an index in which the resistance to stone drilling according to a conventional example 1, explained later, was set to 100. If the value of the index is larger, then the number of stone drillings is smaller, which indicates that the pneumatic tire 1 is more excellent in the resistance to stone drilling. In the test on the snow traction performance, startability of the vehicle on a snow-covered road was evaluated by driver's feeling, and was evaluated using an index in which the snow traction performance according to the conventional example 1, explained later, was set to 100. If the value of the index is larger, then the pneumatic tire 1 is more excellent in the snow traction performance.

As the pneumatic tire 1 to be tested, there are six types as the present invention, two types as a comparative example which are compared with these according to the present invention, and two types as a conventional example. These types were tested in the above method. According to the conventional example 1, the protrusions 30 formed into a cuboid are formed at intervals in the groove 20. According to a conventional example 2, the protrusions 30 are continuously formed to become rib-shaped. According to a conventional example 3, the protrusion 30 is not separated from the block 15 and is formed with the same width as the width of the groove 20, and is formed into a wavefront shape in which irregularities are repeated along the direction in which the groove 20 is formed. Therefore, when the wavefront is viewed at one cycle, a slope such as the slope 36 of the protrusion 30 is formed in two directions along the groove 20. In comparative example 1 and comparative example 2, and inventions 1 to 6, the protrusions 30 having the above shape are formed, and the number of slopes 36 and each angle θ of the slops 36 are different from one another among the protrusions 30. Evaluation tests on the pneumatic tires 1 according to the conventional examples 1 to 3, the comparative example 1 and the comparative example 2, and the inventions 1 to 6 were conducted in the above method, and the results obtained are shown in FIG. 17 and FIG. 18. In these figures, FIG. 17 indicates the evaluation test results of the conventional examples 1 to 3 and the comparative example 1 and the comparative example 2, while FIG. 18 indicates the evaluation test results of the inventions 1 to 6.

As clearly understood from the test results of FIG. 17 and FIG. 18, even when the protrusions 30 are provided in the groove 20, if the protrusions 30 are arranged without intervals or the protrusions 30 are not separated from the blocks 15, then the capacity of the groove 20 decreases, which causes the snow traction performance to become lower (conventional example 2, conventional example 3). Even when the slope 36 is provided in the protrusion 30, if the slope 36 is not provided in two directions along the groove 20, then the stone 50 trapped within the groove 20 cannot surely be ejected, which prevents improvement of the resistance to stone drilling (comparative example 1). If the angle θ of the slope 36 is made greater than 60°, then the stone 50 trapped within the groove 20 easily catches on the protrusion 30 when the stone 50 moves in the direction in which the groove 20 is formed, through rotation of the pneumatic tire 1. Thereby, the stone 50 cannot be ejected, which prevents improvement of the resistance to stone drilling (comparative example 2).

On the other hand, in the inventions 1 to 6, since the slope 36 is formed in two directions at least along the groove 20 and the angle θ of the slope 36 is formed in a range from 3 to 60(, the resistance to stone drilling can be improved while the snow traction performance is ensured. It is noted that the snow traction performance of the present invention 6 is "95" and this value is lower than the snow traction performance of the conventional example 1. But, because the value is lower only by 5, it can be assumed that the snow traction performance is ensured.

In the above explanation, although the pneumatic tire 1 having the block pattern is explained as an example, the pneumatic tire 1 according to the present invention may be any type of those which include the tread area 10 having any pattern other than the block pattern, such as a rib pattern and a rib-lug pattern. Even if the pneumatic tire is other than the pneumatic tire 1 having the block pattern, it should just have the sloped portion 35 formed in two directions at least along the direction in which the groove 20 is formed, in the same manner as that of the pneumatic tire 1 having the block pattern. For example, in the case of the pneumatic tire having the rib pattern, the sloped portion 35 may be formed not only in two directions along the direction in which the groove 20 is formed, but also in the direction orthogonal to the direction in which the groove 20 is formed. If the pneumatic tire 1 has the grooves 20 in which the protrusions 30 can be formed in the above manner, any of the patterns may be used.

Furthermore, in the above explanation, the sloped portion 35 is formed in positions in two directions which are mutually opposite to each other with respect to the protrusion main portion 31 along the groove 20, but the sloped portion 35 may be formed only in one direction along the groove 20. For example, since the stone 50 trapped within the groove 20 often moves in the opposite direction to the direction of rotation of the pneumatic tire 1, if the rotation direction of the pneumatic tire 1 is decided as only one direction, the sloped portion 35 may be formed on only a side in the rotation direction of the pneumatic tire 1 with respect to the protrusion main portion 31. If the rotation direction of the pneumatic tire 1 is decided as only one direction, the direction in which the stone 50 trapped within the groove 20 is moved by the rotation of the pneumatic tire 1 is only the direction opposite to this rotation direction. Therefore, by forming the sloped portion 35 on the side in the rotation direction of the pneumatic tire 1 with respect to the protrusion main portion 31, the stone 50 is moved outwardly in the tire radial direction, thereby being ejected from the groove 20. Consequently, when the rotation direction of the pneumatic tire 1 is decided as one direction, the resistance to stone drilling can be improved even if the sloped portion 35 is formed only in one direction along the groove 20. Furthermore, by forming the sloped portion 35 only in one direction, the capacity of the groove 20 can be increased. Therefore, when the vehicle runs on the snowy road, much more snow can be pushed aside. Accordingly, the snow traction performance can be more reliably ensured.

INDUSTRIAL APPLICABILITY

The pneumatic tire according to the present invention is useful for improvement of the stone drilling, and especially suitable for improvement of the resistance to stone drilling while the snow traction performance is ensured.

The invention claimed is:

1. A pneumatic tire comprising:
   a tread area that is divided into a plurality of lands by a plurality of grooves formed in the tread area, wherein
   each of the grooves includes a plurality of protrusions arranged at intervals on a bottom of the groove,
   the protrusions are lower than the lands from the bottom of the groove, and separated from the lands,
   each of the protrusions includes
   a protrusion main body having a top portion that is a highest portion from the bottom of the groove; and
   a slope portion having a slope that makes an angle with the bottom of the groove in a range between 3 degrees and 60 degrees, and
   the slope portion is formed in at least one direction along the groove,
   wherein a joint is provided between two adjacent protrusions,
   a height of the joint is equal to or less than 1 millimeter from the bottom of the groove,
   the two adjacent protrusions are connected by the joint, and
   wherein the slope portion is formed in three directions or more with respect to the protrusion main body.
2. The pneumatic tire according to claim 1, wherein
   the slope portion is formed in at least two opposite directions with respect to the protrusion main body along the groove.

3. The pneumatic tire according to claim 1, wherein a width of the slope is 0.7 time to 1.1 times of a width of the top portion in a direction of the width of the slope.

4. The pneumatic tire according to claim 1, wherein a height of the top portion from the bottom of the groove is equal to or more than 2 millimeters and equal to or less than a half of a height of the lands.

5. The pneumatic tire according to claim 1, wherein the lands form a block pattern,
the grooves intersect each other to form an intersection, and
the protrusion main body is located at the intersection.

6. The pneumatic tire according to claim 1, wherein the lands form a block pattern,
the grooves intersect each other to form an intersection,
the protrusion main body is located at the intersection, and
the slope portion is formed in a plurality of directions along the grooves.

7. The pneumatic tire according to claim 1, wherein the lands form a block pattern,
the grooves intersect each other, and
the slope portion is bent from a first groove in which the protrusion main body connected with the slope portion is formed in a direction along a second groove that intersects the first groove.

8. The pneumatic tire according to claim 1, wherein the slope portion is formed in four directions or less with respect to the protrusion main body.

9. The pneumatic tire according to claim 1, wherein the angle between the slope portion and the bottom of the groove is equal to or less than 30 degrees.

10. The pneumatic tire according to claim 1, wherein the protrusion main body and the slope portion are separated from each other.

11. The pneumatic tire according to claim 1, wherein a width of the slope is same as a width of the top portion in a direction of the width of the slope.

12. The pneumatic tire according to claim 1, wherein a width of the slope is different from a width of the top portion in a direction of the width of the slope.

* * * * *